W. THOMSON.
Apparatus for Evaporating Saccharine Juices.
No. 35,047. Patented April 22, 1862.
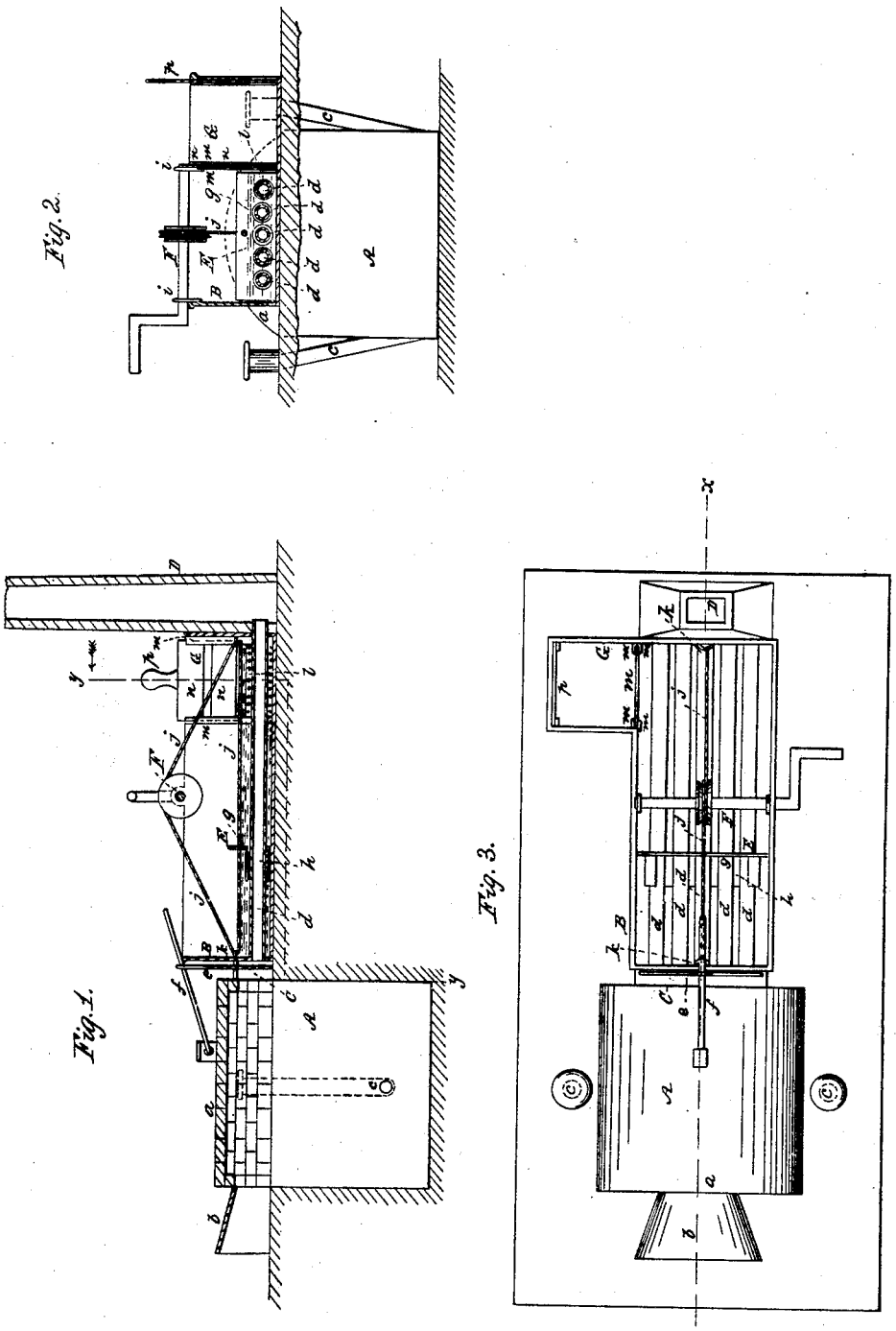

UNITED STATES PATENT OFFICE.

WM. THOMSON, OF DETROIT, MICHIGAN.

IMPROVED APPARATUS FOR EVAPORATING SACCHARINE JUICES.

Specification forming part of Letters Patent No. 35,047, dated April 22, 1862.

*To all whom it may concern:*

Be it known that I, WILLIAM THOMSON, of Detroit, in the county of Wayne and State of Michigan, have invented a new and Improved Apparatus for Evaporating Saccharine Liquids; and I do hereby declare that the following is a full, clear, and exact description of the same, reference being had to the accompanying drawings, forming part of this specification, in which—

Figure 1 represents a longitudinal vertical section of my invention, the plane of section being indicated by the line $x\,x$, Fig. 3. Fig. 2 is a transverse vertical section of the same, taken in the plane indicated by the lines $y\,y$ in Fig. 1. Fig. 3 is a plan or top view of the same.

Similar letters of reference indicate corresponding parts in the several figures.

The object of this invention is to arrange a furnace and an evaporating-pan in such relation to each other that the expressed stalks from the sugar-cane may be used as fuel, and thereby an economical and very effective apparatus for evaporating saccharine liquids is produced.

The invention consists in the arrangement of a pit dug in the ground or built up of brick, and provided with suitable air-holes and a damper, and with a conical arched spout to receive the stalks and refuse of sugar-cane, in combination with an evaporating-pan furnished with a series of heating-tubes, in such a manner that the heat derived from burning the expressed stalks and refuse of sugar-cane in said pit may be passed through the heating-tubes in the pan, or that the communication between the pan and the pit may be shut off at pleasure. It consists, further, in the arrangement of a reciprocating scraper acting on the exterior surface of the heating-tubes and on the bottom of the pan in such a manner that the juice is prevented sticking to the heating-surface, where it would be burned and so impart a disagreeable flavor and color to the sirup.

To enable others skilled in the art to make and use my invention, I will proceed to describe it.

The furnace A, in which the stalks or refuse are to be burned, is constructed of a pit, which may be dug in the ground or built up of brick, and which is covered by an arch, $a$, and it is provided on its front with a spout, $b$, through which the fuel is introduced. This spout is tapering from its mouth toward the furnace, so that the same can always be kept crowded full with stalks and refuse, to answer the same purpose as a door during the time the furnace is in operation, and at the same time that portion of the stalks and refuse which remains in the spout is dried, and when pushed in by the introduction of a fresh supply it burns readily and gives a good flame. Two air-holes, $c$, serve to introduce air near to the bottom of the pit, and these air-holes are provided with plugs or covers, whereby the draft can be regulated. When the pit is dug in the ground said air-holes are produced by boring down from the surface of the ground near to the bottom of the pit, or pipes may be inserted, as shown in the drawings. The pit A communicates with the pan B by a passage or flue, C, and the pan is furnished with a series of heating-tubes, $d$, which are placed a few inches above the bottom of the pan in a longitudinal direction extending from the flue C through to the chimney D. A damper, $e$, which is opened and closed by means of a lever, $f$, or in any other convenient manner, regulates the draft of the fire through the heating-tubes.

The evaporating-pan B may be made of wood with cast-iron plates on both ends to receive the heating-tubes, or it may be constructed in any other desirable manner. The tubes $d$, through which the flame passes from the furnace to the chimney, form the heating-surface of the pan, and in order to prevent the juice sticking to them and getting burned a scraper, E, is provided, to which a reciprocating motion in a longitudinal direction is imparted by a windlass, F. This scraper consists of a vertical plate, $g$, perforated with a number of holes to correspond to the heating-tubes and guided by a horizontal plate, $h$, the ends of which are turned up, so as to form semi-sleeves, as clearly shown in Figs. 1 and 3 of the drawings. The perforated plate $g$ is slipped on the tubes $d$ before the latter are inserted into the tube-sheets at the ends of the pan, and it extends close down to the bottom of said pan, so that on being carried along by the action of the windlass it keeps the outside surface of the heating-tubes and the inside surface of the bottom of the pan clean, and prevents the formation of scale on the same.

The windlass F has its bearings in lugs $i$ secured to the sides of the pan, and it connects by means of a chain or cord, $j$, with the scraper E. Said cord is wound on the drum of the windlass, and after passing through eyes $k$ in the ends of the pan, its ends are firmly connected to the scraper, as clearly shown in Fig. 1.

G is the self-skimmer, which consists of an elbow extending from the main body of the pan B, as clearly shown in Figs. 2 and 3. In this elbow there is no heating-surface, and during the boiling, therefore, all the scum will be driven into it. Its bottom part connects with the main pan through a screen, $l$, of wire-gauze or other suitable material, and above said screen there are guides $m$ for inserting slats $n$, which serve to accommodate the whole device to the different quantities of juice that may be put in at different times. For instance, if the pan is filled to a foot of the top these slats are removed, so as to form a gate about six inches below the surface of the liquid. During the time these six inches of juice have boiled away, all the scum that will rise has been thrown off, and the gate then begins to separate it from the main body of the liquid. In the meantime the wire-gauze will allow all the clear juice to pass through, and retain nothing but the scum. If, now, the pan is emptied, which is effected through the opening $o$ in its side, (see Fig. 2,) nothing remains in the elbow G but scum, and by raising the gate $p$ in the end of the elbow all the refuse can be scraped out at one stroke. From this description it will be seen that by the combination of the pit A and pan B an apparatus for evaporating is produced which is at once economical and effective. It is economical because the furnace or pit can be constructed at a trifling expense and in almost any locality, and it allows of burning the expressed stalks and refuse of the sugar-cane, which otherwise are of very little use, and it is very effective, because it produces a quick heat, which can be regulated at pleasure, and it allows of boiling down the juice originally introduced and emptying the pan without trouble.

Having thus fully described my invention, what I claim as new, and desire to secure by Letters Patent, is—

1. The arrangement of the pit A, with the conical arched spout $b$, damper $e$, and air-holes $c$, in combination with the pan B, provided with heating-tubes $d$, all arranged substantially in the manner and for the purpose herein shown and described.

2. The employment or use of the reciprocating scraper E, in combination with the heating-tubes $d$ and pan B, as and for the purpose specified.

WM. THOMSON.

Witnesses:
   THOMAS LINN,
   A. MACADAM.